United States Patent
Jinzenji et al.

[15] 3,699,419
[45] Oct. 17, 1972

[54] POWER THYRISTOR CHOPPER

[72] Inventors: Toshimasa Jinzenji; Kenji Ichimura; Shoji Ito, all of Tokyo, Japan

[73] Assignee: Tokyo Shibaura Electric Co., Ltd., Kawasaki-shi, Japan

[22] Filed: June 11, 1970

[21] Appl. No.: 45,365

[52] U.S. Cl. ................318/341, 318/376, 321/45
[51] Int. Cl. ...........................................H02p 5/34
[58] Field of Search......318/258, 376, 380, 246, 269, 318/341, 138, 227, 345; 321/45 C, 2, 43, 44; 323/DIG. 1

[56] References Cited

UNITED STATES PATENTS

| | | |
|---|---|---|
| 3,307,091 | 2/1967 | Johannes....................318/138 |
| 3,496,444 | 2/1970 | King et al.............323/DIG. 1 |
| 3,544,879 | 12/1970 | King.....................318/227 X |
| 3,594,629 | 7/1971 | Kawakami et al........321/45 C |
| 3,315,145 | 4/1967 | Menard....................321/45 C |
| 3,297,930 | 1/1967 | Payne......................318/341 |
| 3,207,974 | 9/1965 | McMurray...............321/45 C |

*Primary Examiner*—Gene Z. Rubinson
*Attorney*—Flynn and Frishauf

[57] ABSTRACT

A power thyristor chopper is generally composed of at least two main thyristors which function to repeat turn-on and turn-off in turn during each one cycle operation of the chopper. A capacitor unit is commonly combined with the main thyristors to supply a commutating discharge current for each of them in a reverse direction. There are also provided a plurality of auxiliary thyristors for charging the capacitor unit in alternative polarities from a d.c. voltage source and selectively discharging in the reverse direction through the main thyristors which are in the turn-on state. This chopper is adapted to be preferably installed on a d.c. electric car to adjust its motor voltage or a braking current flowing through its motor.

16 Claims, 6 Drawing Figures

3,699,419
FIG. 1
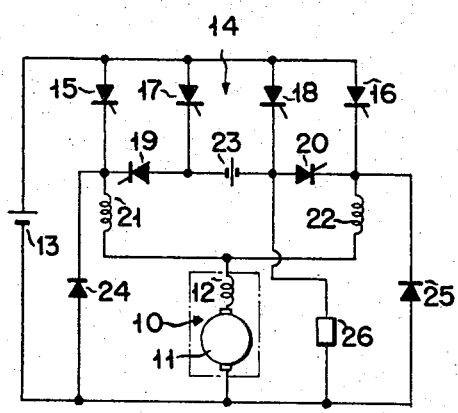
FIG. 3
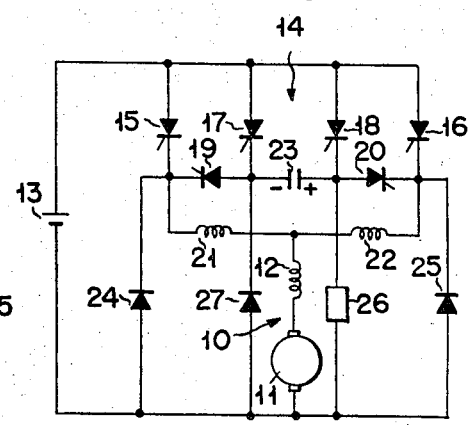
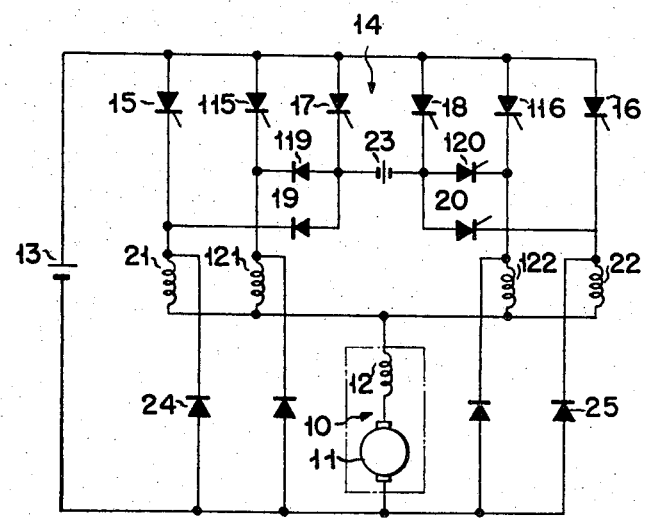
FIG. 2

POWER THYRISTOR CHOPPER

The present invention relates to a power thyristor chopper interrupting the output from a d.c. voltage source by using the thyristors as the switching means.

Recently, a chopper has come to be used in a d.c. power circuit having a large capacity to adjust the amplitude of d.c. voltage and/or current, especially since power thyristors have developed. Such a chopper will be defined as a thyristor chopper hereinafter. As an example, when the thyristor chopper is used in a powering circuit of an electric car to apply a variable voltage for its driving motors which run with variable speed, an electric current having ripples of large amplitude flows through said powering circuit as well as a catenary wire. The term "powering" means running operation of the electric car by forcing its driving motor from the d.c. voltage source. The ripple current flowing through the catenary wire would generate serious inductive interference for adjacent communication lines or signal lines so as render them incapable of adequate service or signal transfer. It is therefore required to reduce the ripples involved in the output of a thyristor chopper.

To achieve this end, heretofore, it has been contemplated that a plurality of thyristor choppers connected in parallel relationship to each other are connected in series with a single powering circuit so as to operate in predetermined sequence during one cycle of operation of the chopper system. Thus, the choppers operate in a polyphase manner rather than in a single phase manner to reduce the amplitude of the ripples.

The effect mentioned above is also adapted to the regenerative braking of the electric car in a similar manner to that of the powering operation thereof except that the regenerative current having the ripples is returned back to the catenary wire from the driving motors which are operating as generators driven by the force due to moment of inertia of the electric car itself.

However, the thyristor chopper requires a commutating capacitor to turn off the thyristor which is in the turn-on state. Accordingly, in a polyphase type chopper, there are required a number of capacitors corresponding to the number of phases. Thus the chopper would become too large in its overall dimensions to mount in a small space of the flat bottom of the electric car and would be too costly.

It is therefore an object of the invention to provide an improved thyristor chopper which does not include the aforementioned disadvantages.

It is another object of the invention to provide a thyristor chopper of polyphase type capable of using a common capacitor or capacitors with respect to each of the phases.

It is a further object of the invention to reduce the space factor of the thyristor chopper where it is installed on the flat bottom of an electric car.

It is a still further object of the invention to provide a thyristor chopper of the polyphase type which is small in size, easy to mount in a small space of the flat bottom of the electric car and also economical to manufacture.

SUMMARY OF THE INVENTION

An aspect of the invention is to provide a thyristor chopper capable of effective adaptation for the powering, dynamic braking and regenerative braking circuits of the driving motors for an electric car.

In accordance with the present invention, a chopper, which operates in the polyphase mode, is formed by at least two main thyristor units and is arranged in a d.c. voltage circuit to adjust the average amplitude of d.c. voltage and/or current of said circuit by intermittent interruptions thereof. The main thyristor units operate one by one in the predetermined order during one operation cycle of the chopper, each conducting period of which is defined by the values of output voltage and/or current to be desired. The two main thyristor units are provided with a single common commutating capacitor unit which supplies commutating currents for each of main thyristors to make it transfer from its turn-on state to its turn-off state one in turn.

Other objects and advantages of the invention will become apparent from the following description taken in connection with the accompanying drawings, in which FIG. 1 is a schematic diagram of a powering circuit for an electric car embodying the present invention;

FIG. 2 shows a circuit diagram similar to that of FIG. 1 except with a different number of phases;

FIG. 3 is a schematic diagram, similar to that of FIG. 1, of another embodiment of the invention;

Figure 4:
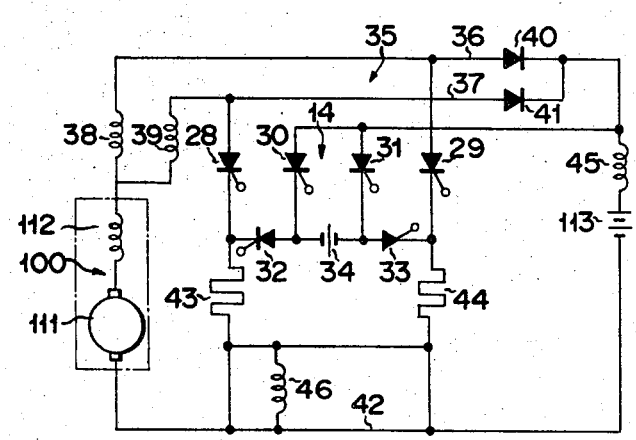
FIG. 4 shows a regenerative braking circuit for an electric car in accordance with the invention.

Referring now to FIG. 1, there is shown a powering circuit for an electric car which includes a series motor 10 comprising an armature 11 and a series field winding 12. The series motor 10 is connected to a relatively constant d.c. voltage source 13 through a switching means (not shown), a catenary wire or a third rail and grounded rails as well as a thyristor chopper 14 in accordance with the invention. These catenary wire or third rail and grounded rails are represented by only two conductors led to the d.c. voltage source 13. The chopper 14 comprises two main thyristors 15 and 16 and four auxiliary thyristors 17, 18, 19 and 20. The anode of thyristor 15 is connected to a positive pole of source 13, and the cathode thereof is connected to one of terminals of the motor 10 through a smoothing reactor 21. The other terminal of the motor 10 is connected to a negative pole of source 13. Similarly, the anode of the main thyristor 16 is connected to a positive pole of source 13 and the cathode thereof is connected through a smoothing reactor 22 to said one of terminals of the motor 10. The auxiliary thyristors 17 and 19 are connected in series circuit relation so as to have unidirectional conducting polarities and the series combination thereof is connected in parallel circuit relation across the main thyristor 15. Similarly, the other auxiliary thyristors 18 and 20 are connected in series circuit relation so as to have unidirectional conducting polarities, and the series combination thereof is connected in parallel circuit relation across the main thyristor 16. It will be understood that each of the main and auxiliary thyristor units can include one or more elements connected in series and/or parallel circuit relation responsive to the amplitude of circuit voltage and/or current.

A commutating capacitor unit 23 is connected between an intermediate connecting point of thyristors 17 and 19 and a similar point of thyristors 18 and 20. The capacitor unit 23 can include one or more capacitive elements, but hereinafter referred to as "capacitor 23". To keep the motor current at a value at the moment of abrupt current interruption of the chopper 14 and thereby to avoid the generation of high dangerous voltage in the inductive circuits which include series combinations of the motor 10 and the smoothing reactor 21 or 22, there are connected flywheel diodes 24 and 25 across said inductive circuits as shown, respectively. Thus, there is no component being subjected to dielectric breakdown in the circuit.

It is assumed that all of the thyristors in the chopper circuit 14 are in the turn-off state, the motor 10 is not energized from the d.c. power source 13 and the electric car at a standstill.

To start the car, the auxiliary thyristors 17 and 20 are simultaneously given their gating pulses so as to make them turn on at the same time. To this end, the commutating capacitor 23 would be charged by the d.c. voltage source 13 through thyristor 17, capacitor 23, thyristor 20, smoothing reactor 22, and motor 10 until the voltage across thereof becomes substantially equal to the source voltage. The thyristors 17 and 20 will turn off automatically after charging up of the capacitor 23. It will be understood that the capacitor 23 has a positive charged polarity at the lefthand terminal and negative at the righthand. The main thyristor 15 is then turned on by applying a gate pulse thereto, a powering current flows from d.c. voltage source 13 to motor 10 through the main thyristor 15 and smoothing rector 21 to start the electric car. After an amount of powering current has flowed through the motor 10, then the auxiliary thyristors 18 and 19 are turned on by applying gate pulses thereto. In this case, the charge of capacitor 23 discharges through thyristors 19, 15 and 18 so that the discharge current flows through main thyristor 15 in an inverse direction to make it turn off. Simultaneously, the capacitor 23 becomes charged in a reverse polarity with respect to that as mentioned above, and the charging current ceases when the charged voltage has become substantially equal to a difference between the source voltage and the back electromotive force of the motor 10. Thus, the auxiliary thyristors 18 and 19 would turn off automatically. Similarly after an amount of powering current has flowed through the motor 10, the auxiliary thyristors 17 and 20 are turned on in the same manner as described firstly and the capacitor 23 supplies a discharge current to the main thyristor 16 in a reverse direction to make it turn off. In this way, one operation cycle of the chopper has been accomplished, and then the same operation cycles would be made repeatedly until the speed of electric car increases to a desired value.

Each conducting period of time of the main thyristors 15 and 16 of the chopper 14 is controlled by a gate control device (not shown) so that the average value of the motor current is held at a predetermined value, for example, the rated current value of the motor 10, under the control of a conventional current limiting relay located in a powering circuit and responsive to the motor current. It will be readily understood that the ratio of each conducting period to non-conducting period of the main thyristors 15 and 16 would become gradually larger as the car speed and the voltage to be added to the motor increase, and there would finally remain a relatively shorter non-conductive period between successive larger conductive periods, respectively. In this way the chopping of the main thyristors 15 and 16 continues through the powering operation of the car.

There is, however, the other operation made of the chopper, in which all the main thyristors 15 and 16 are turned on simultaneously at the end of the powering operation of the car. When this final state has been reached, the voltage added to the motor 10 would become substantially equal to the source voltage and the voltage across the capacitor 23 becomes zero because both thyristors 15 and 16 are controlled to be simultaneously conductive. This results in one problem that there would occur a difficulty of restarting of chopper 14 to restart the electric car after finishing of a prior running operation of the car. The voltage across the commutating capacitor 23 has an amplitude insufficient to flow a large commutating current through a main thyristor 15 against a restarting current flowing therethrough.

To prevent the above difficulty, there is provided an impedance element 26, for example, a resistor or a reactor having substantial resistance, which is connected between one of terminals of the capacitor 23 and a conductor led to the negative pole of d.c. voltage source 13. By virtue of the impedance element 26 and by turning on the auxiliary thyristor 17 except 18, 19 and 20, the capacitor 23 is charged up effectively from d.c. voltage source 13 through thyristor 17 and the impedance element 26 even when main thyristors 15 and 16 become conductive simultaneously. Thus the chopper would be made ready for restarting of the electric car after the prior powering operation.

FIG. 2 shows another embodiment, in a four-phase mode, of a powering circuit for an electric car, in which similar parts to those of FIG. 1 are denoted by the same reference numerals. In accordance with this embodiment, there are provided two more main thyristors 115 and 116 and smoothing reactors 121 and 122 connected in series circuit relation to said main thyristors, respectively, and auxiliary thyristors 119 and 120 which act to supply the commutating currents from capacitor 23 for said main thyristors, respectively, and to charge up the commutating capacitor 23 in cooperation with auxiliary thyristors 17 and 18, respectively.

The chopper 14 of FIG. 2 operates in a four-phase mode, that is, firstly main thyristor 15, secondly main thyristor 16, thirdly main thyristor 115 and lastly main thyristor 116 are operated in turn within one operation cycle of the chopper. It can be understood that two auxiliary thyristors 17 and 18 are employed in common use to four auxiliary thyristors 19, 119, 20 and 120 and only one commutating capacitor 23 is utilized in common to all the thyristors.

In FIG. 3, there is shown another embodiment of the invention which is substantially the same powering circuit as that of FIG. 1 and similar parts of which are denoted by the same reference numerals as those of FIG. 1. During the powering operation, it is assumed that the charged polarity of commutating capacitor 23 has taken the polarity as shown and all of the thyristors have been in their off state. The potential of the righthand terminal of the capacitor 23 would take amplitude dividing the voltage of d.c. voltage source 13 by the leakage resistance value of thyristor 18 and the resistance value of resistor 26. However, the leakage resistance value of the thyristor is extremely high relative to that of the charging resistor 26. As a result, said potential of the righthand terminal of the capacitor 23 may nearly approach to the potential of the negative terminal of the d.c. voltage source 13. Accordingly, the sum of the source voltage and the capacitor voltage, which is substantially twice the amplitude of the source voltage, may be added across one thyristor 17. This means that a thyristor, which has a dielectric strength (i.e., reverse breakdown voltage) which is higher than that of any other, should be used as the auxiliary thyristor 17 and thereby the chopper would become costly.

In accordance with this embodiment, to eliminate the above defect described there is provided a clamp diode 27 which is connected between the lefthand terminal of the commutating capacitor 23 and a conductor led to the negative terminal of the d.c. voltage source 13. As is clearly shown, the clamp diode 27 establishes a series closed circuit with the capacitor 23 and the resistor 26. Accordingly, the commutating capacitor 23 which has a charged polarity as shown may be discharged through the resistor 26 and the diode 27. Thus if there will occur any electrical conduction through the diode 27, the potential at the lefthand terminal of capacitor 23 and the cathode of the auxiliary thyristor 17 will become equal to the potential of the negative pole terminal of source 13. To this end, the voltage added across the thyristor 17 would be held at a value substantially equal to the source voltage at the instant as pointed out above. Thus it can be understood that there can be used a thyristor as thyristor 17, which has the same dielectric strength as the others.

In the other embodiment shown in FIG. 4, a thyristor chopper 14 is employed to adjust the regenerative braking force for the electric car and includes two main thyristors 28 and 29 and four auxiliary thyristors 30, 31, 32 and 33 as well as a common commutating capacitor 34 in the same manner as described in FIG. 1. The driving motor 100 comprising an armature 111 and a series field 112 is connected at one terminal thereof to a positive terminal of a d.c. voltage source 113 through a parallel circuit 35 which includes a pair of conductors 36 and 37 which include smoothing reactors 38 and 39 and diodes 40 and 41 connected in series circuit relation, respectively, and the other terminal of the motor 100 is connected to a negative terminal of the d.c. voltage source 113 through a conductor 42. The d.c. voltage source 113 has been shown as a battery, but it may usually be a combination of a catenary wire or a third rail respectively held at high voltage level and grounded rails. The main thyristor 28 has an anode connected to a conductor 37 between reactor 39 and diode 41, and has a cathode connected to a conductor 42 through a resistor 43. Similarly, the main thyristor 29 has an anode connected to a conductor 36 between reactor 38 and diode 40, and has a cathode connected through a resistor 44 to a conductor 42.

To make the regenerative brake function for the electric car, the circuit indicated in FIG. 4 is first established. The motor generates a voltage of a small amplitude across thereof due to a residual magnetism which has been resulted from the prior powering operation. Now the auxiliary thyristors 30 and 33 are turned on simultaneously, whereby the commutating capacitor 34 is charged up by the d.c. voltage source 113 through said two thyristors 30 and 33 and resistor 44 and the charged polarity of the capacitor becomes positive at its lefthand terminal and negative at its righthand terminal one. The auxiliary thyristors 30 and 33 would turn off naturally when the charged voltage of capacitor 34 becomes substantially equal to the voltage of the source 113. The main thyristor 28 is turned on now. As a result, there is flowed an electric current through armature 111, series field winding 112, smoothing reactor 39, main thyristor 28 and resistor 43. This forces the field of the motor and would result in a building-up of the induced voltage of the motor to increase the braking current.

In this way, the regenerative braking current would flow from the motor 100 to the d.c. voltage source 113 through smoothing reactor 39 and diode 41 when the amplitude of the induced voltage of the motor has overcome that of the source voltage. The auxiliary thyristors 31 and 32 are now turned on simultaneously to discharge capacitor 23 through thyristors 32 and 28, diode 41 and thyristor 31. It can be seen that the discharge current would flow in the inverse direction through the main thyristor 28 to make it turn off. The auxiliary thyristors 31 and 32 are turned off when the charged voltage level of the capacitor becomes substantially equal to that source voltage level. In this case, the polarity of the charged voltage becomes inverse relative to the aforesaid one. The main thyristor 29 is then turned on whereby a current flows from the motor 100 to the resistor 44 through smoothing reactor 38 and main thyristor 29 to build up the motor voltage. In this case, the regenerative braking current would flow from the motor 100 to the d.c. voltage source 113 through smoothing reactor 38 and diode 40 when the induced voltage of the motor would overcome the source voltage. The two auxiliary thyristors 30 and 33 are turned on at an appropriate time after the turn-on of main thyristor 29 and cause the latter to turn off. The two thyristors 30 and 33 are turned off naturally when the capacitor 34 has been charged up to a voltage value substantially equal to the source voltage level. Thus, the circuit would return to the state mentioned firstly and the chopper 14 completes its one cycle operation. The operation cycles of chopper 14 will continue during the operation thereof.

The electric braking force for the electric car is adjusted under the control of two current limiting relays 45 and 46. For simplifying the illustration, these relays are shown as only one coil, respectively, one of which is arranged to respond to the regenerative current and the other is arranged to respond to the total current of the chopper 14, respectively. Both relays 45 and 46 are interlocked with each other by any suitable means, so that the former 45 controls the chopper responsive to only the regenerative current in a relatively high speed range of the car, whereas the latter 46 controls the chopper in response to its current only in a relatively low speed range of the car. It is assumed that the electric car is running in said high speed range and reduces the speed thereof by the electric braking. As mentioned above, when the braking circuit is established as shown, the relay 45 is prepared for its operation but it does not respond to the regenerative current as the latter is at zero level. Thus, the chopper 14 will begin its operation cycles repeatedly under the control of relay 45 whereby the induced voltage of the motor 100 would build up rapidly as mentioned above. The regenerative current is fed back to the d.c. voltage source 113 through the relay coil 45 when said induced voltage of the motor overcomes the source voltage level, and then the relay 45 operates responsive to the predetermined increase of the regenerative current to stop the operation of the chopper 14. The electric car reduces its speed gradually by the regenerative braking effect so that the regenerative current fed back to the source as well as the induced voltage of the motor is also gradually reduced to the extent incapable of displaying the regenerative braking effect satisfactorily. The relay 45 is now reset to begin the operation cycles of the chopper 14 again, whereby the motor current and voltage would build up again so as to feed back the regenerating current which has an amplitude predetermined by the current limiting relay 45. The relay 45 operates again to cause the operation of the chopper to stop. In this way, the operation and stop cycles of the chopper 14 are repeated sequentially while the regenerative brake is accomplished effectively, and the amplitude of the regenerative current is effectively limited to a predetermined value by the current limiting relay 45 because the relay causes the operation of the chopper 14 to stop every time the predetermined building up of the regenerative current has been established.

As is shown in FIG. 4, the two main thyristors 28 and 29 are individually combined with parallel circuits which include conductors 36 and 37 and the smoothing reactors 38 and 39, respectively. The reactors 38 and 39 alternatively operate in such a manner that when the regenerative current flowing through one of them is reduced due to turn-off of the associated main thyristor, the regenerative current flowing through the other increases due to turn-on of its associated main thyristor. The reactors 38 and 39 function also to retard the reducing of the regenerative current by exhausting their accumulated electric energy when the associated main thyristors turn off, respectively. Thus, the ripple component is little involved in the total regenerative current fed to the d.c. voltage source 113. In accordance with this embodiment, two resistors 43 and 44 are separately associated with the main thyristors 28 and 29, respectively. By this arrangement it is easy to charge the commutating capacitor 34 because the voltage drops across the resistor 43 or 44 due to the sequential conducting of the main thyristor 28 or 29 have no influence to prevent the flow of charging current for said capacitor, whereby the commutating current having an amplitude sufficient to make the main thyristor turn off can be always provided.

Assuming that the speed of the electric car has been reduced to a lower limit by the regenerative brake, the regenerative current fed back to the d.c. voltage source would become substantially zero. To this end, the relay 45 causes the chopper 14 to continuously operate without its rest periods and all of the braking current would flow through the chopper circuit so that the electric energy generated by the motor 100 would become to be consumed with resistors 43 and 44, respectively. In this way, the electric brake for the electric car transfers from the regenerative one to the dynamic one. The amplitude of the dynamic braking current is controlled under the control of the relay 46 to hold a substantially constant value which is substantially equal to the prior regenerative current. In this case, where the sequential turn-on intervals for the main thyristors 28 and 29 are fixed, each of conducting periods for the main thyristors is controlled to be gradually lengthened as the induced voltage of the motor 100 is reduced responsive to the reducing of the car speed, thus the entire electrodynamic braking current is held at a substantially constant amplitude to obtain a constant brake torque. Since the manners for chopping the chopper 14, charging and discharging the capacitor 34, turning on and turning off the main thyristor as well as the functions of reactors 38 and 39 are similar to those as mentioned with respect to the regenerative brake, the description of them is omitted. The main thyristors 28 and 29 would become to be conductive simultaneously at the end of the dynamic brake, and thereby the short circuit for the motor 100 would take place.

Figure 5:
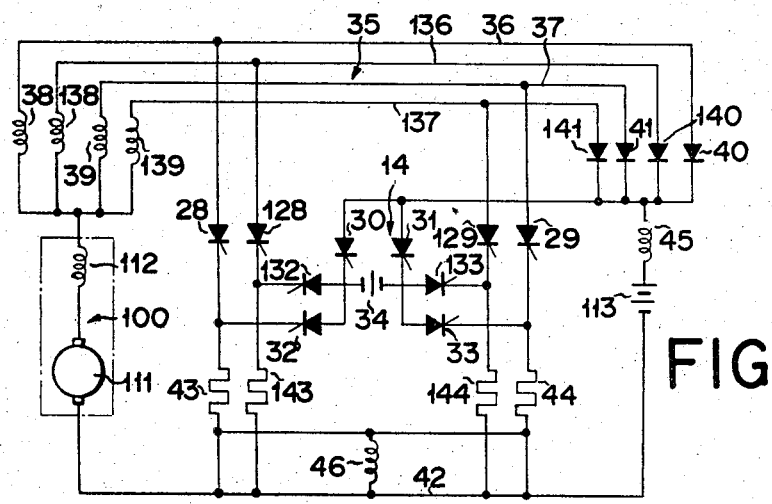
FIG. 5 is a circuit diagram similar to that of FIG. 4 in which it is intended to increase the number of phases.

FIG. 5 shows the regenerative brake circuit embodying the present invention, in which the chopper 14 is formed to operate in the four-phase mode and the parts identical to those of FIG. 4 are shown by the same characters. During the regenerative braking the electric power generated by the motor 100 is fed back to the d.c. voltage source 113 through a parallel circuit 35 consisting of four conductors 36, 136, 37 and 137 which include reactors 38, 138, 39 and 139 and diodes 40, 140, 41 and 141 connected in series relation, respectively. The chopper 14 has four main thyristors 28, 29, 128 and 129, anodes of which are connected to conductors 36, 136, 37 and 137 between said reactors and diodes, respectively. The cathodes of main thyristors are connected to conductor 42 led to the negative pole of the motor 100 through separate resistors 43, 44, 143 and 144 and a common current limiting relay 46. To flow the commutating current from a common capacitor 34 through respective main thyristors 28, 128, 29 and 129, there are provided four auxiliary thyristors 32, 132, 33 and 133 as shown, respectively. The capacitor 14 is charged to desired polarities by the d.c. voltage source 113 through two auxiliary thyristors 30 and 31 which turn on and turn off alternatively and said four thyristors 32, 33, 132 and 133 are associated with the thyristors 30 and 31. Since the operation of the disclosed circuit is similar to that of FIG. 4 except that it operates in four-phase mode during one cycle operation of the chopper 14, the further description thereof is omitted.

Figure 6:
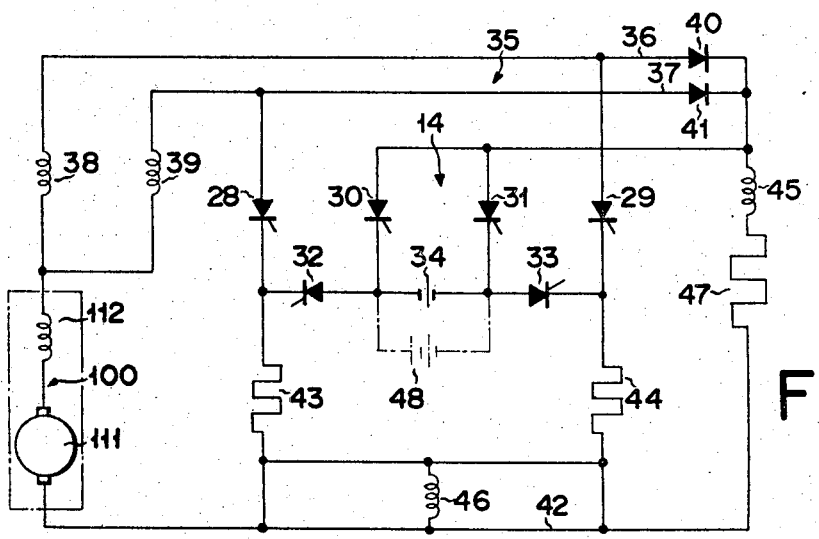
FIG. 6 shows a dynamic braking circuit embodying the invention.

FIG. 6 shows a dynamic braking circuit for the electric car and including similar components to those of FIG. 4 except that a braking resistor 47 which wastes the electric power generated by the motor 100 as heat energy is used in place of the d.c. voltage source 113 of FIG. 4.

In this embodiment, it is necessary to provide an auxiliary d.c. source 48 for charging the capacitor 34 temporarily because the induced voltage of the motor has an amplitude insufficient to charge said capacitor before the beginning of dynamic brake. After charging up the capacitor 34 in a polarity, that is, positive at leftward terminal thereof and negative rightward, the main thyristor 28 would result in turn-on state. The induced voltage due to a residual magnetism of the motor would produce a current flowing through the series field winding 112, reactor 39, main thyristor 28 and resistor 43. The resistance values of resistors 43 and 44 are selected to an extremely low value so that there is nothing to prevent the building up of the motor voltage, thereby the motor voltage would build up rapidly. The thyristors 31 and 32 are then turned on, and the discharge current of the capacitor 34 would flow through the thyristor 32, main thyristor 28 in reverse direction thereof, diode 41 and thyristor 31, whereby the main thyristor 28 transfers to turn-off state. The capacitor 34 would be charged now in reverse polarity by the motor voltage, and then the main thyristor 29 is turned on to flow the motor current through the field 112, reactor 38, main thyristor 29 and resistor 44. Thus the motor voltage and current are further established. After the thyristors 30 and 31 are turned on to make the main thyristor 29 turn off and to make the capacitor return to its original charged polarity. Thus the one cycle operation of the chopper 14 would be completed. The operation cycles of the chopper are continued to repeat for a period of time during which the current flowing through resistor 47 would grow to a predetermined value to operate the relay 45. In this way, a dynamic brake having a value preset by the relay 45 is carried out and the relay 45 stops the operation of the chopper 14. The relay 45 resets to start the chopper operation again when the effect of the dynamic brake becomes lower than that preset by the relay. Thus the chopper operation is repeated intermittently to reduce the car speed gradually and to cause the motor field to force to give the desired braking effect for the electric car.

It will be easily understood that the respective rest periods of the chopper would become gradually short relative to the respective operation periods thereof because the relay 45 would become to reset with gradually earlier time as the speed of the car is reduced, and finally the chopper would become to operate continuously when the relay 45 would become not to operate again. When the car speed has reduced to such a lower limit where the relay 45 can not operate further, the chopper 14 would become to be controlled by the relay 46 rather than the relay 45. The setting current value of the relay 46 is, of course, substantially equal to that of the relay 45 so that there is no change of the braking torque. The chopper 14 is controlled by the relay 46 to maintain a mean value of its current at a substantially constant value so that each conducting period of the main thyristors 28 and 29 would become gradually long during a fixed one operation cycle of chopper as the speed of car is reduced. This gradual increasing of each conducting period of the main thyristors 28 and 29 would continue until both thyristors 28 and 29 would conduct simultaneously. Thus the car speed is reduced to the lowermost one capable of effectively obtaining the dynamic braking, and then an air brake would be taken to stop the car as finishing brake. In this embodiment, there are used two relays 45 and 46 separately, however such a common relay may be employed to accomplish the same object. In this case, the relay is connected to the resistor 43 so as to be responsive to a current flowing through the resistor during the first step of the dynamic braking and alternatively to the chopper so as to be responsive to the chopper current during the second step of the brake. It will be easily understood that the circuit shown in FIG. 6 may be changed so as to be operated in any suitable polyphase mode similar to the four-phase mode in the regenerative system disclosed in FIG. 5.

In accordance with the invention, since a single capacitor unit can be commonly employed for accomplishing the commutation for even number of main thyristors which form a polyphase mode chopper, it is possible to provide the thyristor chopper which is small in its entire dimensions, inexpensive to manufacture and easy to mount on the flat bottom of the electric car, and also has a small spece factor. Because the thyristor chopper according to the invention operates in polyphase mode, the amplitudes of the ripples involved in the current flowing through the catenary wire or third rail for the electric car become extremely smaller than those of a chopper which operates in a single phase mode whereby eliminating the inductive interferences for adjacent communication lines or signal lines so as to be capable of satisfactorily serving or transferring the signals when the thyristor is employed in a powering circuit, a dynamic braking circuit or a regenerative circuit for said electric car.

What we claim is:

1. A multi-phase thyristor chopper arranged in a d.c. voltage circuit to adjust the average amplitude of unidirectional d.c. voltage and/or current coupled via said circuit to a single-phase output utilization device by interrupting said circuit intermittently, said thyristor chopper comprising:

an even number of main thyristor units connected in said d.c. voltage circuit to interrupt the circuit intermittently by repeating turn-on and turn-off operations in turn, thereby intermittently interrupting unidirectional current flow to said output utilization device, a single capacitor unit connected in common with said main thyristor units to supply a commutating current in an inverse direction for each of the main thyristor units which is in the turn-on state, and a plurality of auxiliary thyristor units arranged in parallel with said main thyristor units, said auxiliary thyristor units each including at least two series connected auxiliary thyristors, said common single capacitor unit being connected between a pair of junctions of said series connected auxiliary thyristors, said auxiliary thyristor units being arranged so as to charge said common single capacitor unit with alternative polarities from said d.c. voltage source and to discharge the charged single capacitor unit in an inverse direction through each of said main thyristor units which is in a conducting state to turn it off.

2. A thyristor chopper according to claim 1, in which said even number of main thyristor units are connected in series with respective smoothing reactors, the series combinations of the respective main thyristor units and the smoothing reactors are connected in a parallel circuit system to form the chopper which is connected between a d.c. voltage source having a substantially constant voltage level and a driving motor which comprises said output utilization device, said main thyristors are actuated to repeat turn-on and turn-off operations alternately and regulate the period of conduction during one cycle of operating the chopper, respectively, to supply a variable average level d.c. voltage from the d.c. voltage source to said driving motor, and said auxiliary thyristor units are connected in parallel with said main thyristor units, said auxiliary thyristor units being further connected in parallel with each other with respect to said d.c. source and in series with said d.c. source with respect to said capacitor unit so that said auxiliary thyristor units operate to selectively charge and discharge said capacitor unit.

3. A thyristor chopper according to claim 2, wherein said main thyristors are operated to repeat turn-on and turn-off operations alternately during one cycle of operating the chopper thereby regulating the ratio of the turn-on to the turn-off period as to gradually increase said ratio while said motor is being powered.

4. A thyristor chopper according to claim 3, in which the main thyristors perform a chopping action even when said motor is actuated by said d.c. voltage source at a voltage level substantially equal to that of the source.

5. A thyristor chopper according to claim 3, in which the main thyristors are operated simultaneously when the powering of said motor is ceased.

6. A thyristor chopper according to claim 5, wherein one of the terminals of said capacitor unit is connected to one of the terminals of the d.c. voltage source through an impedance means, and the other terminal of said capacitor unit is connected to the other terminal of said d.c. voltage source through an auxiliary thyristor unit which is still kept in a conducted state when the powering operation of said motor has substantially come to an end, thereby allowing said capacitor unit to be charged from the d.c. voltage source with a predetermined polarity through said auxiliary thyristor unit and said impedance means.

7. A thyristor chopper according to claim 1, in which said even number of main thyristor units are connected with respective series resistors to reliably limit the amount of electric current flowing therethrough, a regenerative braking circuit means is connected between an electric motor unit and a d.c. voltage source to return the electric power generated by said motor unit acting as a generator unit to said d.c. source during a braking operation, said circuit means including a plurality of conductors arranged in parallel and connected between one of the terminals of said motor and one of those of said d.c. voltage source, each of said conductors including a series combination of a smoothing reactor and a diode which prevents an inverse current from being supplied from said d.c. source to said motor, each of said series combinations of main thyristor units and resistors is connected at its one end to each of said conductors connected in parallel between said smoothing reactors and diodes, the other end contacting a conductor connecting the other terminal of the motor with the other terminal of the d.c. source, whereby the chopper is so operated as to actuate said motor unit to return its regenerative power to said d.c. source and stop its operation when the regenerative power is fully returned to said d.c. source.

8. A thyristor chopper according to claim 7, in which the chopper repeats its on and off operations alternatively while the regenerative braking is conducted and is continuously operated when the regenerative effect becomes insufficient, thereby changing the braking operation from the regenerative type to the dynamic type due to said resistors connected in series with said main thyristors.

9. A thyristor chopper according to claim 7, in which said smoothing reactors provided in said parallel conductors respectively function such that when current decreases in one of them, current increases in the other, whereby the ripples involved in the regenerative current are reduced by return to said d.c. voltage source.

10. A thyristor chopper according to claim 1, in which said even number of main thyristor units are connected with respective series resistors to reliably limit the amout of electric current flowing therethrough, a dynamic braking circuit means is connected between an electric motor unit and a main resistor unit to cause the electric power generated by said motor unit acting as a generator to be expended in said resistor unit as heat energy during a braking operation, said circuit means includes a plurality of conductors arranged in parallel and connected between one of the terminals of said motor unit and one of those of said main resistor unit, each of said conductors including a series combination of a smoothing reactor and a diode which prevents a reverse current from being supplied from the main resistor unit, each of said series combinations of main thyristor units and series resistors is connected at its one end to each of said conductors connected parallel between said reactors and diodes, the other end contacting a conductor connecting the other terminal of the motor with the other terminal of the main resistor, whereby the chopper is so operated as to actuate said motor unit by controlling the main resistor through adjustment of generated power and to stop its operation when the dynamic braking due to the main resistor is effective.

11. A thyristor chopper according to claim 10, wherein said smoothing reactors connected with said parallel conductors respectively function such that when current decreases in one of them, current increases in the other, whereby the ripples involved in the current flowing through the main resistor unit are reduced.

12. A thyristor chopper according to claim 10, in which the chopper repeats its on and off operations alternately during the first dynamic braking cycle due to the actuation of said main resistor unit, and is operated continuously when the first dynamic brake becomes insufficient, whereby the dynamic brake is changed from a first stage to a second stage due to the series connection of said resistors with said main thyristors.

13. A thyristor chopper according to claim 1 wherein said capacitor unit comprises a plurality of capacitors coupled together to present a single capacitance value.

14. A thyristor chopper circuit according to claim 1 wherein one of said two series connected auxiliary thyristors of an auxiliary thyristor unit is connected in common to serve as one of the series connected auxiliary thyristors of another auxiliary thyristor unit, said common auxiliary thyristor being connected in common with at least two main thyristor units.

15. A thyristor chopper according to claim 14 including at least four main thyristor units and four auxiliary thyristor units, pairs of said auxiliary thyristor units sharing a series connected auxiliary thyristor in common.

16. A thyristor chopper according to claim 1 wherein said output utilization device is a series connected motor.

* * * * *